(12) United States Patent
Bauer et al.

(10) Patent No.: US 9,779,132 B1
(45) Date of Patent: Oct. 3, 2017

(54) PREDICTIVE INFORMATION DISCOVERY ENGINE

(71) Applicant: EMC Corporation, Hopkinton, MA (US)

(72) Inventors: Andreas L. Bauer, Boxborough, MA (US); David A. Parenti, Westborough, MA (US); Michael Zeldich, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 612 days.

(21) Appl. No.: 14/143,089

(22) Filed: Dec. 30, 2013

(51) Int. Cl.
*G06F 17/30* (2006.01)

(52) U.S. Cl.
CPC .. *G06F 17/30424* (2013.01); *G06F 17/30477* (2013.01); *G06F 17/30867* (2013.01)

(58) Field of Classification Search
CPC ......... G06F 17/30424; G06F 17/30477; G06F 17/30769; G06F 17/30867
USPC ....................................................... 707/769
See application file for complete search history.

(56) References Cited

U.S. PATENT DOCUMENTS

| | | | |
|---|---|---|---|
| 7,389,282 B2 | 6/2008 | Maren | |
| 8,375,037 B2 | 2/2013 | Sethi et al. | |
| 9,548,050 B2* | 1/2017 | Gruber | G06F 17/3087 |
| 2003/0126136 A1* | 7/2003 | Omoigui | G06F 17/3089 |
| 2008/0086688 A1* | 4/2008 | Chandratillake | G06F 17/30817 715/719 |
| 2009/0157605 A1* | 6/2009 | Kelly | G06F 17/3012 |
| 2010/0070448 A1* | 3/2010 | Omoigui | H01L 27/1463 706/47 |
| 2010/0145917 A1* | 6/2010 | Bone | G06F 17/30082 707/694 |
| 2010/0174939 A1* | 7/2010 | Vexler | G06F 17/3048 714/5.1 |
| 2011/0196864 A1* | 8/2011 | Mason | G06F 3/0416 707/728 |
| 2011/0276632 A1 | 11/2011 | Anderson et al. | |
| 2012/0069131 A1* | 3/2012 | Abelow | G06Q 10/067 348/14.01 |
| 2012/0117049 A1* | 5/2012 | Zhou | G06F 17/30864 707/706 |
| 2013/0167036 A1* | 6/2013 | Klein | G06Q 30/02 715/738 |

(Continued)

*Primary Examiner* — Mark E Hershley
(74) *Attorney, Agent, or Firm* — BainwoodHuang

(57) ABSTRACT

A computer executes a predictive information discovery engine in an operating environment that includes execution of an application with which a user interacts to accomplish a task. Trigger signals are received from trigger components that monitor the user's interaction with the application and respond to user actions to generate the trigger signals. The trigger signals include signal-specific metadata obtained from a store of metadata including current context information about the user's use of the application. The trigger signals are automatically responded by (i) querying external data sources for information relevant to a current operating context as reflected in the signal-specific metadata, and (ii) for information returned in response to the querying, presenting the returned information to the user in the current operating context to enable the user to use the presented information in connection with the task.

18 Claims, 4 Drawing Sheets

(56) References Cited

U.S. PATENT DOCUMENTS

2013/0239006 A1* 9/2013 Tolkachev ........ G06F 17/30864
715/738
2015/0006524 A1* 1/2015 Jose .................. G06F 17/30389
707/726

* cited by examiner

PREDICTIVE INFORMATION DISCOVERY ENGINE

BACKGROUND

The invention is related to the field of intelligent data searching and retrieval.

Existing approaches for leveraging information sources require a user to explicitly query different subs-system individually, manually filtering and sorting through results to apply the user's personal assessment of relevance based on the user's current work context. This process is very time intensive, repetitive and prone to error, because often a correct piece of information is not discovered because of incorrect input. This can result in information not being found or information being found which despite its apparent relevance is in fact not useful. Existing processes also require a user to explicitly switch contexts from their current workflow task to an information retrieval task and then back—repetitively.

SUMMARY

A disclosed approach allows for information to be queried from information sources based on a set of relevant workflow metadata, significantly increasing the probability that the correct information items (artifacts) will be located. In addition, the system includes an ability to learn from the use or non-use of artifacts that are presented to a user, so that the system tunes its queries over time on a per-system, per-user or per-workflow basis. The system provides a querying service transparently, so that a user's workflow is not interrupted and no context switching is required—information is brought to a user rather than the user having to go to the information.

In particular, a method is disclosed for operating a computer as a predictive information discovery engine in an operating environment, the operating environment including execution of one or more applications with which a user interacts to accomplish a task. The method includes receiving trigger signals from trigger components in the operating environment, where the trigger components monitor the user's interaction with the application and respond to predetermined user actions to generate the trigger signals. The trigger signals also include signal-specific metadata that is obtained from a store of metadata including current context information about the user's use of the application.

The method further includes automatically responding to the trigger signals to (i) query external data sources for information relevant to a current operating context of the user and applications as reflected in the signal-specific metadata from the trigger signals, and (ii) for information returned in response to the querying, present the returned information to the user in the current operating context to enable the user to use the presented information in connection with the task.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
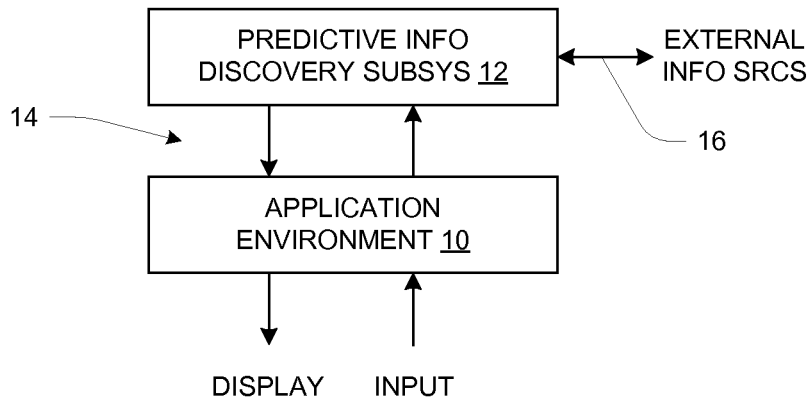
FIG. 1 is a block diagram of an operating environment of a computer system.

FIG. 1 shows components of a computing system including an application environment 10 and a predictive information discovery subsystem 12, also referred to as PIDS 12 herein. The application environment 10 includes a set of one more executing application programs (applications) along with related utilities/extensions and components of an operating system and graphical user interface (GUI) that work together in some manner to support a user performing a task. Examples are discussed below. The application environment 10 interfaces with a user by outputting graphical information to a display and by receiving user input such as keystrokes, mouse clicks, etc. The PIDS 12 has connections or "hooks" 14 into the application environment 10 for purposes of monitoring activity and injecting content to be made available to the user. The PIDS 12 also has external connections 16 by which it accesses external information sources such as web sites, databases, etc.

In operation, the application environment 10 provides certain information and functionality to a user according to the specifics of the application. One example is a software development environment in which a user is writing programs (code) for a new or updated software product. Modern software development environments are "integrated" environments in that they include several areas of functionality that previously were standalone programs/tools. A modern software development environment includes compile-time tools such as an editor, compiler and linker, as well as run-time tools such as a "debugger" that enables the monitoring and control of execution of test versions of a program under development. Thus, the application environment 10 is the initial and primary point of user interaction with the computer system for performing a desired task, such as writing a new program in the above example.

The PIDS 12 provides an extension and enhancement to the application environment 10. It is a software-implemented component that is able to observe workflow patterns of a user and use information about user context and activity to query available information sources for information that may be relevant, and presents this additional information to the user in a transparent and intelligent manner. The user then has immediate access to additional information that may be helpful in the task being performed, perhaps even before realizing the need for this information. It will be appreciated that this can greatly enhance effectiveness and efficiency, helping reduce the user's need to invoke different applications and engage in separate sub-tasks to get necessary information and then return to the primary task.

In particular, the proposed approach allows for information to be queried from the external information sources based on a large set of relevant workflow metadata, significantly increasing the probability that the correct information will be located. In addition, the system has the ability to learn from the user's use or non-use of presented information and thus to tune its queries over time, on a per-system, per-user or per-workflow basis. Because the system provides this querying service transparently, the user's workflow is not interrupted, there is no context switching—information is brought to the user rather than the user going to the information.

Figure 2:
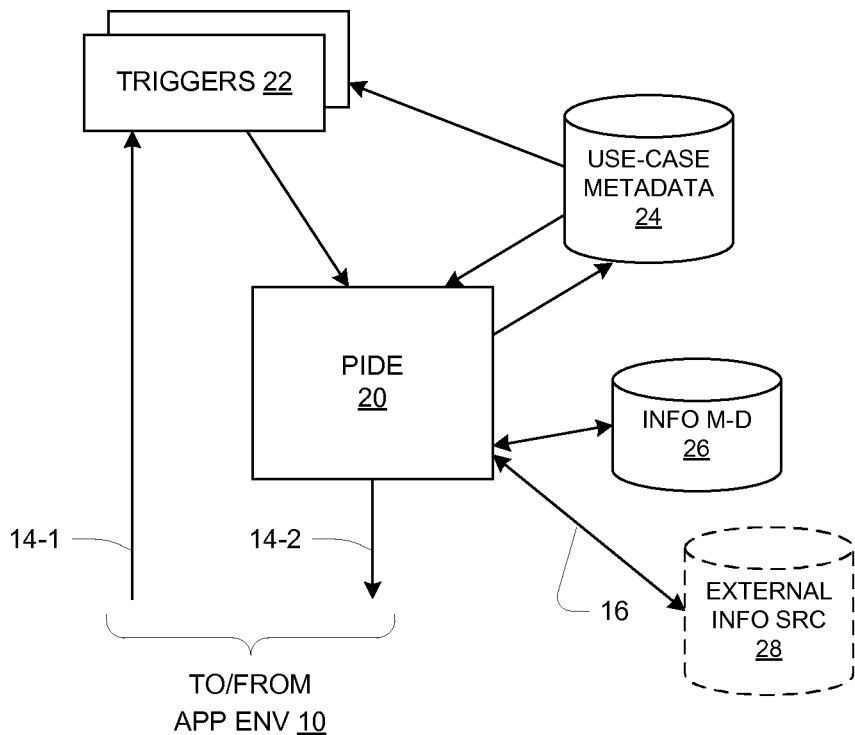
FIG. 2 is a block diagram of a predictive information discovery subsystem of the operating environment.

FIG. 2 illustrates an organization of the PIDS 12. The core component is a predictive information discovery engine (PIDE) 20. Other components includes trigger components (triggers) 22, use-case metadata 24, and information metadata 26 that pertains to the information obtained from the external information sources 28. As shown, the connections 14 include connections 14-1 from the application environment 10 to the triggers 22, and connections 14-2 from the PIDE 20 to the application environment 10. The connections 14-1 provide indications of operating events that cause the triggers 22 to be activated. For example, one connection 14-1 might provide an indication that a user has opened a particular type or name of a file, and there may be a trigger 22 defined that, upon receiving this indication, causes certain activity of the PIDE 20 to be initiated. These kinds of hooks may be implemented using known techniques, such as software interrupts, callbacks, etc. The connections 14-2 provide a way for the PIDE 20 to present the information that it obtains from the external sources 28 to the user. For example, a connection 14-2 may be a call to a function that will add a tabbed pane to a current pane-style display element, where the tabbed pane being added includes information to be presented, or alternatively a call to a function to display a pop-up window or similar element for displaying information obtained from the external sources 28.

The trigger components 22, which are also referred to as "workflow triggers", may be implemented as plug-ins for applications, APIs, etc. More information about triggers 22 is provided below.

The use-case metadata 24 captures information about context that is useful for guiding the activity of the PIDE 20. Context information can include identifications of applications being used, execution context of an application, identification of any open (in-use) media, time of day, location, user, etc. The use-case metadata 24 also makes associations that help establish what information may be relevant. For example, a user might be part of a development group including some number of users, and the use-case metadata 24 can capture this association among these users. The use-case metadata 24 can also capture important dependencies to help enforce an official procedure, project plan, policy, etc. Referring again to the software development example, a project may have rules requiring that modules are tested in a certain way before they are incorporated into new builds of higher-level components. The use-case metadata 24 can capture that kind of rule, enabling the PIDE 20 to do things like remind a user or even present a test tool at an appropriate time whether or not explicitly requested by the user.

The use-case metadata 24 can be created and maintained in a variety of ways. Generally, it will be defined according to a domain-specific schema, and it may be populated from other information collections by a fill-in process (e.g., extract/transform/load or ETL).

The PIDE 20 provides the core functionality of responding to trigger signals from the triggers 22 and associated use-case metadata 24 to generate queries to the external information sources 28 and then selectively present the information received in response to the queries to the user. It can be implemented using different kinds of intelligent-machine technologies, such as rules engines, gaming algorithms, heuristics, etc. It is preferable adaptive, learning from a user's responses to presented information to adjust how it obtains and presents information in the future. Thus in operation it maintains and uses a historical record of such responses.

The information metadata 26 is information stored by the PIDE 20 regarding information that it has accessed from the external sources 28, used in managing that access for most efficient operation. It can include identification of information items (e.g., names of files, databases, media items etc.) as well as information regarding age, content, owner, location, last access, frequency of access, etc.

In operation, workflow triggers 22 are fired based on the user's actions in the application environment 10. The triggers 22 pass relevant meta-data about the context of the user, relevant actions and information, to the PIDE 20. The PIDE 20 leverages the metadata to query all relevant information sources for anything which may be applicable and useful given the user's current context. The relevant information is presented to the user in an asynchronous fashion relative to their workflow action. As certain information which was deemed to be relevant is either accessed or ignored, the PIDE 20 can adjust its relevance algorithms accordingly for future queries on either a system or user basis. A solution composed of these components is able to discover and present relevant information to the user without the user needing to explicitly search for it, to learn from the users interest in certain materials as to what may be of more or less interest in the future and to in general provide a much more intelligent way of accessing large repositories of static information. This type of predictive intelligence can be applied to any information source and for many workflow use-cases.

The PIDS 12 may be implemented in a variety of fashions. Generally it includes one or more computers executing software to realize functional components such as the triggers 22, PIDE 20, etc. The PIDE 20 may be implemented as an "appliance", i.e., a physical or virtual computer system providing PIDE functionality with interfaces as needed to other components (e.g., triggers 22, metadata 24, etc.) and into the application environment 10. The triggers 22 may be plug-in style modules that can be embedded in the application environment 10 in some manner. For example, they might be included in an appliance having a peer-like status in a user's network environment, and in some cases they might even be deployed on the same physical/virtual machine on which a user application executes. In the latter case the triggers 22 are preferably as lightweight as possible, i.e., the may have reduced functionality and correspondingly lower resource consumption (memory, CPU, etc.). If deployed on a separate appliance with adequate resources, the triggers 22 can have higher/richer functionality, such as including filters of arbitrary complexity to make most efficient use of the PIDE 20. Also, an attached appliance can be capable of supporting triggers 22 for a number of users and/or applications.

The metadata 24 is a specialized store and may be realized in a database, for example. Because of its close association with the specific application environment 10, it may preferably be localized in some manner to an organization. For example, it may be located on-premises in an organization's datacenter, or deployed as part of an organization's private cloud.

Figure 3:
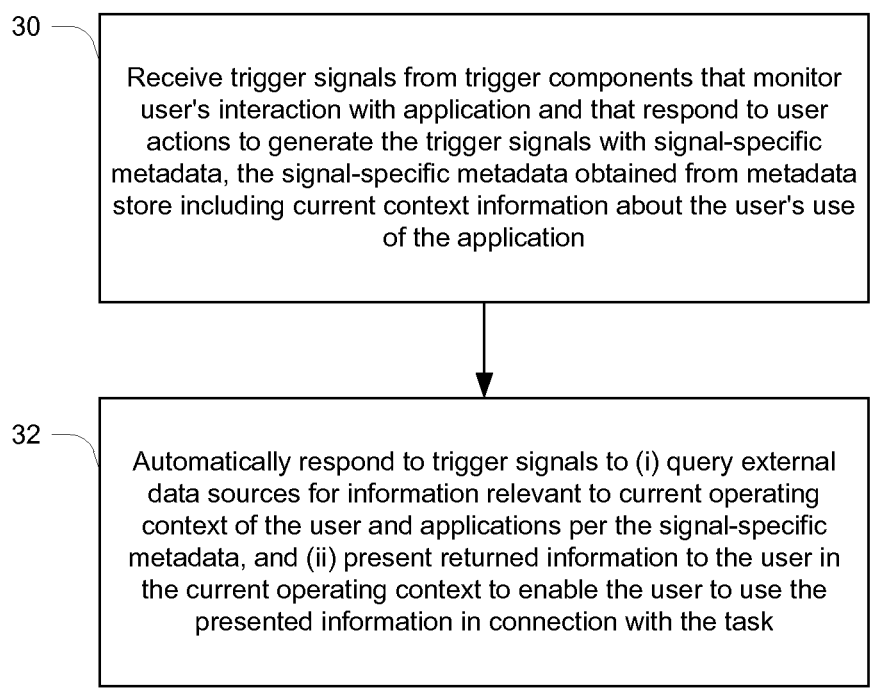
FIG. 3 is a high-level flow diagram of a method of predictive information discovery and presentation.

FIG. 3 illustrates operation of the PIDE 20 at a high level. At 30, it receives trigger signals from trigger components 22 in the operating environment. The trigger components monitor the user's interaction with an application and responding to predetermined user actions to generate the trigger signals each including signal-specific metadata. The signal-specific metadata is obtained from a store of metadata 24 including current context information about the user's use of the application.

At 32, the PIDE 20 automatically responds to the received trigger signals to (i) query external data sources 28 for information relevant to a current operating context of the user and the application(s) as reflected in the signal-specific metadata from the trigger signals. It also (ii) presents returned information to the user in the current operating context to enable the user to use the presented information in connection with the task being performed by the user.

One example use case is in a software development environment. A developer opens a given file, such as a C++ source code file, within their IDE (integrated development environment). Upon opening the file, the IDE or an IDE plug-in notifies the PIDE component 20 that the user may be interested in information related to the given source file. Metadata associated with the source file is sent to the PIDE 20 and is used to search information sources 28 for related information items or "artifacts." In this case artifacts may include architecture and design documentation, previous code reviews, API documentation, the contact information of the previous editor, information on source control versions, relevant email threads, discussion forum posts, wikis etc. The PIDE 20 can leverage previous access patterns to select which of these artifacts may be more or less useful and then present them to the user. Artifacts which have been proven to be irrelevant in the past can be excluded etc.

Figure 4:
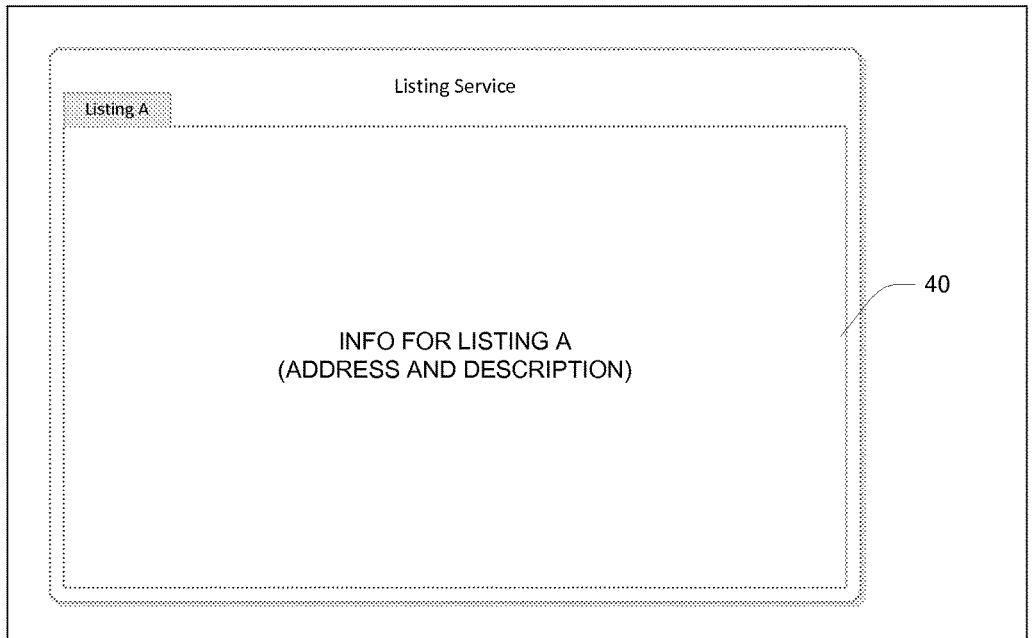
FIGS. 4 and 5 are depictions of a simplified example of a presentation to a user by automatic action of a predictive information discovery subsystem.
Figure 5:
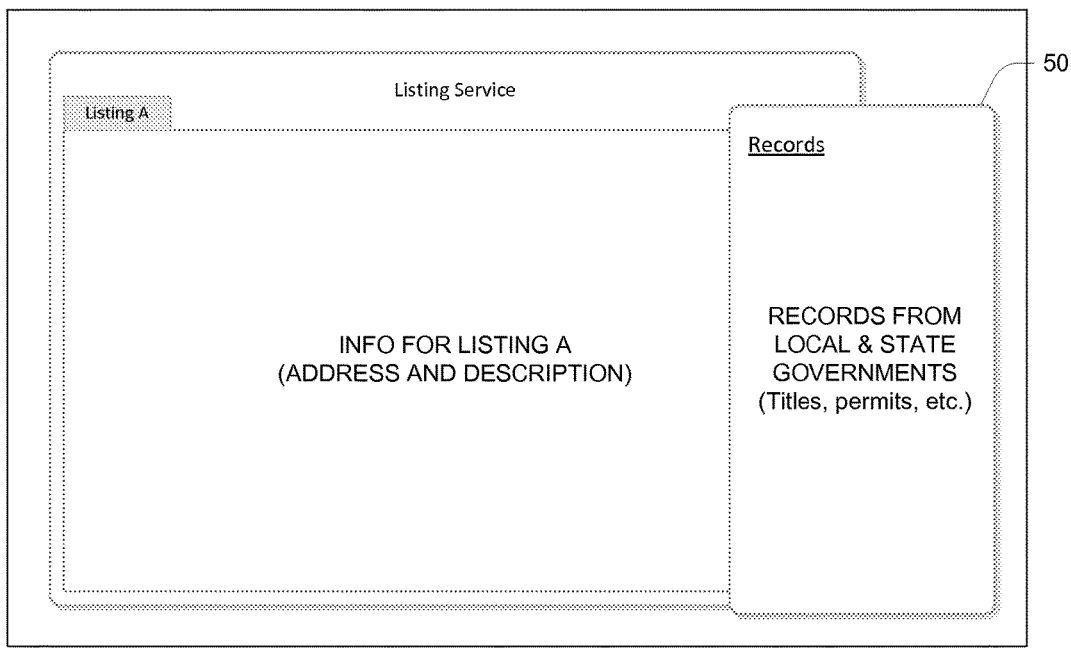

FIGS. 4 and 5 are used to illustrate another example use case from the domain of real estate marketing. In FIG. 4 a realtor has displayed a listing 40 on a display screen 42, for example using a browser accessing a remote multiple listing service (MLS) website. The displayed listing 40 includes the usual information such as address, number of bedrooms, square footage, etc. (not specifically shown). In the background, a browser plug-in (functioning as a trigger 22) sends metadata for the property to the PIDE 20 which searches information sources 28 for relevant artifacts. In this case the artifacts may be town and state records for titles, inspections, liens, site plans, utility maps, previous owners, lead certifications, licensed work orders etc. The PIDE 20 can leverage previous access patterns to select which of these artifacts may be more or less useful and then present them to the user. Artifacts which have been proven to be irrelevant in the past can be excluded etc. FIG. 5 shows an example of the PIDE 20 presenting the information to the user, i.e., by displaying a pop-up window 50 containing the selected information. The realtor can immediately review anything of particular interest to help with the task of summarizing the property for a client, etc., without having to engage in a separate search task to obtain the information.

Figure 6:
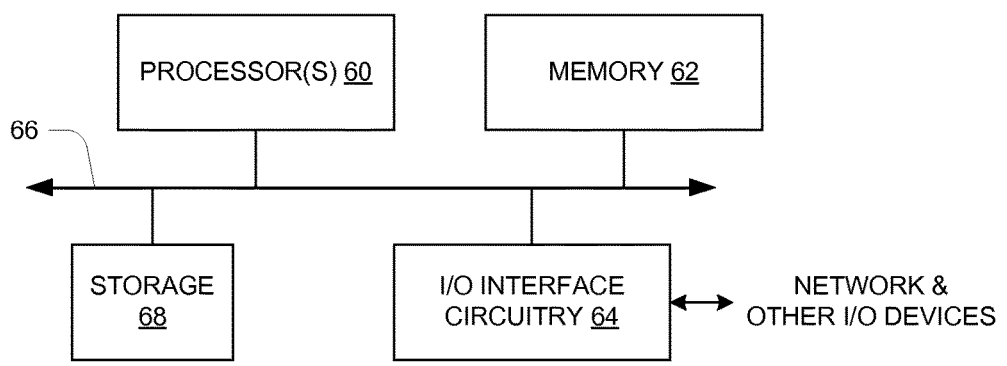
FIG. 6 is a block diagram of a computer from a hardware perspective.

FIG. 6 shows an example configuration of a physical computer or controller from a computer hardware perspective. One or more computers may be utilized to execute software to realize functional components of the system as described above. Candidate configurations include traditional "physical" deployment, i.e., an application installed and executed on a particular physical machine, as well as "virtualized" deployments in which an application is part of a machine image that is executed as a virtual machine on a host physical machine. The hardware includes one or more processors 60, memory 62, and interface circuitry 64 interconnected by data interconnections 66 such as one or more high-speed data buses. The interface circuitry 64 provides a hardware connection to an external network and other external devices/connections (EXT DEVs). The processor(s) 60 with connected memory 62 may also be referred to as "processing circuitry" herein. There may also be local storage 68 such as a local-attached disk drive or Flash drive. In operation, the memory 62 stores data and instructions of system software (e.g., operating system) and one or more application programs which are executed by the processor(s) 60 to cause the hardware to function in a software-defined manner. Thus the computer hardware executing instructions of a predictive information discovery (PID) application, such as described herein, can be referred to as a PID circuit or PID component, and it will be understood that a collection of such circuits or components can all be realized and interact with each other as one or more sets of computer processing hardware executing different computer programs as generally known in the art.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computer as a predictive information discovery engine in an operating environment, the operating environment including execution of one or more applications with which a user interacts to accomplish a task, comprising:

receiving trigger signals from trigger components in the operating environment, the trigger components monitoring the user's interaction with the application and responding to predetermined user actions to generate the trigger signals each including signal-specific metadata, the signal-specific metadata obtained from a store of metadata including current context information about the user's use of the application; and automatically responding to the trigger signals to (i) query external data sources for information relevant to a current operating context of the user and applications as reflected in the signal-specific metadata from the trigger signals, and (ii) for information returned in response to the querying, present the returned information to the user in the current operating context to enable the user to use the presented information in connection with the task, wherein automatically responding to the trigger signals includes, in response to one trigger signal, both (i) querying one of the external data sources and receiving returned information in response to the querying, and (ii) presenting the returned information to the user in the current operating context to enable the user to use the presented information in connection with the task, and wherein the returned information is presented asynchronously with respect to a sequence of operations being performed by the user, and wherein the metadata are organized into use-case metadata and information metadata, the use-case metadata describing (i) the current operating context for the user, (ii) an association of the user with other users, and (iii) dependencies for an official procedure, project plan, or policy, the information metadata describing the information returned from the external data sources and being used to manage the external access for efficient operation.

2. A method according to claim 1, wherein the predictive information discovery engine is a domain-specific engine implemented using one or more of rules engines, gaming algorithms, and heuristics.

3. A method according to claim 1, wherein the querying and presenting are performed based on an indication of information relevance provided by a relevance algorithm of the predictive information discovery engine, and further including:
monitoring the use and non-use by the user of the presented information; and
adjusting the relevance algorithm according to the monitored use and non-use to increase a rate of use of presented information.

4. A method according to claim 1, further including updating the metadata for use in generating future triggers and corresponding queries.

5. A method according to claim 1, wherein the trigger components are program modules having connections into the application to enable the monitoring of the user's interaction with the application.

6. A method according to claim 5, wherein the program modules forming the trigger components include plug-in modules embedded in the application.

7. A method according to claim 1, wherein the metadata in the store of metadata establishes mappings of from aspects of the task to other elements related to the task.

8. A method according to claim 1, wherein the metadata captures dependencies among different tasks in the operating environment that must be satisfied in a predetermined manner.

9. A method according to claim 8, wherein the dependencies include a requirement for testing of a component created in a design task.

10. A method according to claim 1, wherein the metadata are organized according to a domain-specific schema and created by a fill-in process from application data existing in the application environment.

11. A method according to claim 1, wherein the metadata are maintained over a time period significantly longer than a duration of the task to identify long-term trends of usage of the application environment.

12. A method according to claim 1, wherein the external information sources includes sources local to an organization using the operating environment, including separate information management systems of the organization.

13. A method according to claim 1, wherein the external information sources include non-local, publically accessible online information sources.

14. A method according to claim 1, wherein:
the one trigger signal includes an indication that a user has opened a particular type or name of a file;
the metadata includes metadata associated with the particular type or name of the file; and
the returned information presented to the user includes information related to the file.

15. A method according to claim 1, wherein presenting the returned information to the user includes adding a tabbed pane to a current pane-style display element used in the current operating context, the tabbed pane including the returned information to be presented.

16. A method according to claim 1, wherein presenting the returned information to the user includes displaying a pop-up window separate from a current window of the current operating context, the pop-up window including the returned information to be presented.

17. A method according to claim 1, wherein the information metadata includes an identification of information items as well as information regarding age, content, owner, location, last access, and frequency of access.

18. A computer program product comprising a non-transitory computer-readable medium having computer program instructions recorded thereon, the instructions being operative, when executed by a computer, to cause the computer to perform a method of operating as a predictive information discovery engine in an operating environment, the operating environment including execution of one or more applications with which a user interacts to accomplish a task, the method including:
receiving trigger signals from trigger components in the operating environment, the trigger components monitoring the user's interaction with the application and responding to predetermined user actions to generate the trigger signals each including signal-specific metadata, the signal-specific metadata obtained from a store of metadata including current context information about the user's use of the application; and
automatically responding to the trigger signals to (i) query external data sources for information relevant to a current operating context of the user and applications as reflected in the signal-specific metadata from the trigger signals, and (ii) for information returned in response to the querying, present the returned information to the user in the current operating context to enable the user to use the presented information in connection with the task,
wherein automatically responding to the trigger signals includes, in response to one trigger signal, both (i) querying one of the external data sources and receiving returned information in response to the querying, and (ii) presenting the returned information to the user in the current operating context to enable the user to use the presented information in connection with the task,
and wherein the returned information is presented asynchronously with respect to a sequence of operations being performed by the user,
and wherein the metadata are organized into use-case metadata and information metadata, the use-case metadata describing (i) the current operating context for the user, (ii) an association of the user with other users, and (iii) dependencies for an official procedure, project plan, or policy, the information metadata describing the information returned from the external data sources and being used to manage the external access for efficient operation.

* * * * *